United States Patent Office 3,483,217
Patented Dec. 9, 1969

3,483,217
9,10-DIHYDRO-9,10-DIOXOANTHRACENEDIYL-BIS-(4'-CARBAMOYLPHTHALIMIDES
John F. Santimauro, Wyckoff, N.J., and Herman Gerson, New York, N.Y., assignors to Allied Chemical Corporation, New York, N.Y., a corporation of New York
No Drawing. Filed Dec. 2, 1966, Ser. No. 598,632
Int. Cl. C09b 1/46
U.S. Cl. 260—326            5 Claims

ABSTRACT OF THE DISCLOSURE

Production of diimides obtained by reaction of a dianhydride, derived from trimellitic acid and a diamino anthraquinone, and a primary organic amine. The resultant diimides exhibit utility as colorants, i.e. pigments, for organic polymeric masses which are characterized by excellent non-bleeding and light-fastness properties as well as brightness and clarity of shade.

---

This invention relates to a novel class of colorants which are 9,10-dihydro-9,10-dioxoanthracenediyl-bis-(4'-carbamoylphthalimides) which are characterized by excellent non-bleeding and light-fastness properties as well as brightness and clarity of shade, and to the process for the preparation thereof.

It is an object of this invention to provide novel colorants of the 9,10-dihydro-9,10-dioxoanthracenediyl-bis-(4'-carbamoylphthalimide) series.

Another object is to provide a process for the preparation of 9,10-dihydro-9,10-dioxoanthracenediyl-bis-(4'-carbamoylphthalimides).

Other objects and advantages of the present invention will be obvious from the following disclosure.

The novel compounds of our invention have the following general formula:

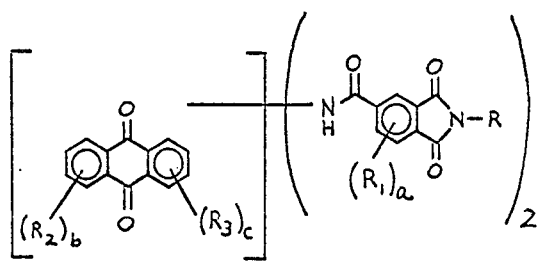

wherein:
R is the residue of a primary organic amine such as an aliphatic or aromatic radical, or heterocyclic radical whose hetero ring member is nitrogen or nitrogen in combination with sulfur, oxygen, or nitrogen, said aliphatic, aromatic or heterocyclic radical being substituted or unsubstituted and containing 1 to 18 carbon atoms; $R_1$, $R_2$, and $R_3$ independently represent hydrogen, halogen, nitro, trifluoromethyl, alkyl, alkoxy dialkylamino, and dialkylsulfamyl radicals, wherein the aforementioned alkyl moeities contain from 1 to 6 carbon atoms; and a, b, and c independently represent integers from 1 to 3.

We have found the novel compounds of the present invention to be useful and valuable pigments. After being processed into a finely divided form, they may be used for coloring organic polymeric materials (such as varnishes and plastics), for the manufacture of printing colors and for spin-dyeing of synthetic fibers such as viscose rayon, "nylon 6," "nylon 6, 6," or polyester fiber. In all of these applications, the novel colorants may be incorporated into the organic products by methods conventional to these several arts. The products of this invention generally give excellent results for mass color when tested according to ASTM Specification D-387-60 Procedure B, Hoover Muller. Since such applications per se, form no part of the present invention, the details, which will be apparent to those skilled in these arts, will not be discussed herein.

The novel compounds of the present invention are prepared by heating a mixture comprising a 9,10-dihydro-9,10-dioxoanthracenediyl-bis-(4' - carbamoylphthalic anhydride) having the following formula:

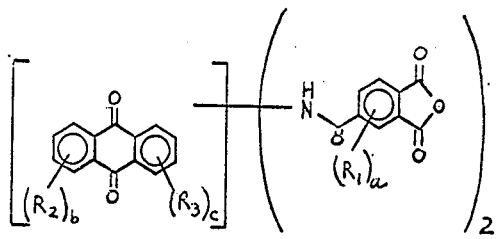

and a primary organic amine, preferably in excess, said amine having the following formula:

$$H_2N—R$$

wherein R, $R_1$, $R_2$, $R_3$, a, b, and c have the same significance as described above. The anhydride component of the above reaction forms the subject of our copending application No. 598,592, now U.S. Patent No. 3,390,155, entitled "Novel Dianhydrides" and filed of even date. The reaction is performed preferably in the presence of an inert solvent, e.g., N,N-dimethylacetamide, nitrobenzene, xylene, toluene, and the like, and mixtures thereof. Water formed as a by-product during the course of the reaction can be removed by azeotropic distillation with the solvent. Temperatures above 100° C., preferably within the range of about 125° to 175° C., are used. The time required will vary inversely with the temperature, but in general from about 5 to about 48 hours will suffice to enable the reaction to proceed essentially to completion. The product, a bis-imide, is generally insoluble in the reaction mixture and can be separated therefrom by filtration or any other convenient means. The product can then be purified by washing with solvents and/or re-slurrying in dilute aqueous acid (to remove unreacted amine) or in dilute aqueous alkali (to remove unreacted anhydride or acidic by-products). The conversion of the resultant purified product to colorant form can be accomplished by conventional means, e.g., grinding with salt, sand, pebbles, vatting, acid pasting, and the like.

The following list of amines which can be used in the above reaction is provided by way of illustration and is not meant to include all the variations falling within the scope of and contemplated as part of our invention.

Aliphatic primary amines:
    methylamine
    n-propylamine
    n-butylamine
    1-amino-2-ethylhexane
    n-decylamine
    cyclohexylamine
    2-aminoethanol
    1-aminoindane
    laurylamine
    stearylamine
    2-methoxyethylamine
    benzylamine
Aromatic primary amines:
    aniline
    the o,m,p-toluidines
    the o,m,p-xylidines 2,4,5-trimethylaniline
3,4,5-triethylaniline
prehniteneamine
the o,m,p-anisidines
2-methyl-4-nitroaniline
2-methyl-5-nitroaniline
the o,m,p-phenetidines
p-aminoacetanilide
p-amyloxyaniline
p-nitroaniline
m-nitroaniline
m,p-dichloroaniline
2,5-dichloroaniline
m-nitro-p-chloroaniline
p-bromoaniline
m-chloroaniline
m-chloro-p-methoxyaniline
3-bromo-5-chloroaniline
3-bromo-4-chloro-6-nitroaniline
3-bromo-5-fluoroaniline
m-bromo-p-isoamylaniline
4-butyl-5-chloroaniline p-phenoxyaniline
o-phenoxy-m-chloroaniline
2,3,4,5,6-pentafluoroaniline
p-phenylmercaptoaniline
alpha-naphthylamine
beta-naphthylamine
p-aminodiphenylamine
o-aminophenol
2-chloro-5-trifluoromethylaniline
o-phenylenediamine
p-fluoroaniline
4-aminosalicylic acid
p-sulfanilic acid
Heterocyclic primary amines:
   2-aminopyridine
   3-aminopyridine
   3-amino-2-picoline
   2-aminobenzothiazole
   2-amino-6-methoxybenzothiazole
   4-aminoquinoline
   8-aminoquinoline
   N-(3-aminopropyl)-morpholine
   2-amino-5-nitrothiazole
   3-amino-9-ethylcarbazole
   5-amino-o-toluenesulfonamide The following examples will further illustrate the products and process of the present invention. The temperatures are given in degrees centigrade, and parts and percentages are by weight unless otherwise specified.

EXAMPLE 1

A. Preparation of a dianhydride

A mixture of 27.5 parts of 1,5-diaminoanthraquinone and 48.4 parts of trimellitic 4-monoacid chloride, 1,2-anhydride in about 420 parts of anhydrous nitrobenzene was heated to and maintained at about 125° for 18 hours. The reaction mixture was cooled to room temperature, the resultant slurry filtered and the filter cake washed with alcohol. The washed cake of 9,10-dihydro-9,10-dioxanthracene - 1,5 - diyl - bis - (4 - carbamoylphthalic anhydride) was dried in air.

B. Preparation of a bis-imide

A mixture of 20 parts of the dianhydride prepared as described in part A above, 9.4 parts of p-anisidine (10% excess) and about 200 parts by volume of N,N-dimethylacetamide was heated to 145° over a period of 2½ hours and maintained at 145° to 150° for 18 hours. The resulting product slurry was filtered and washed first with xylene and then with alcohol. The washed cake was reslurried in about 500 parts of water containing 15 parts of sodium carbonate. The slurry was agitated for about 4 hours and then filtered. The yellow solid was washed with water and dried in a circulating air oven. The dry product was obtained in a yield of about 91% of theory and has the following formula:

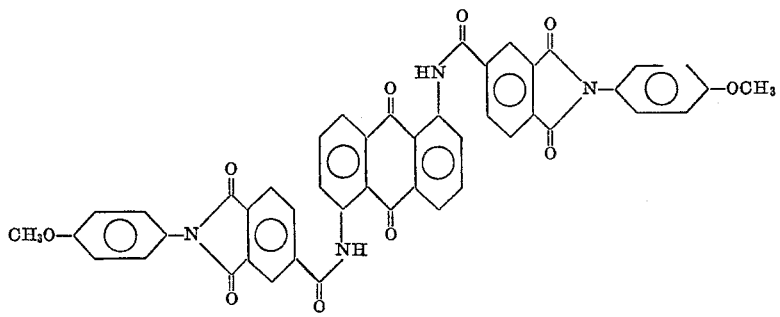

9,10-DIHYDRO-9,10-DIOXOANTHRACENE - 1,5 - DIYL-BIS-(4 - CARBAMOYL-N-(4''-METHOXYPHENYL)-PHTHAL-IMIDE)

It neither melts nor decomposes at temperatures below 320°. The new compound is soluble in alkaline hydrosulfate from which it can be recovered unchanged by oxidation in accordance with the conventional vatting procedures.

*Analysis.*—Calcd. for $C_{46}H_{28}O_{10}N_2$: C, 69.3; H, 3.5; N, 7.2; O, 21.0. Found: C, 68.2; H, 3.6; N, 7.2; O, 21.0.

When reduced to fine pigment form and incorporated into acrylic lacquers in the conventional manner, the product of this example gives excellent non-bleeding, lightfast colorations which are bright yellow.

EXAMPLE 2

The procedure of Example 1, part B, was repeated using an equivalent amount of m-chloro-p-methoxyaniline in place of p-anisidine. The product, 9,10-dihydro-9,10-dioxoanthracene - 1,5 - diyl - bis - (4' - carbamoyl - N(3''-chloro-4''-methoxyphenyl)phthalimide), was obtained in excellent yield as a yellow granular solid.

EXAMPLE 3

The procedure described in Example 1, part B, was repeated except that an equivalent amount of p-phenoxyaniline was used in place of p-anisidine.

The product, 9,10-dihydro - 9,10 - dioxoanthracene-1,5-diyl - bis - (4' - carbamoyl - N - (4'' - phenoxyphenyl) phthalimide), was obtained as a yellow solid in excellent yield.

EXAMPLE 4

The procedure of Example 1, part A, was repeated using 1,4-diaminoanthraquinone in place of 1,5-diaminoanthraquinone. The resulting dianhydride product was reacted with p-anisidine exactly as described in part B of Example 1 to yield a reddish brown solid, 9,10-dihydro- 9,10 - dioxoanthracene - 1,4 - diyl - bis - (4' - carbamoyl-N-(4"-methoxyphenyl)phthalimide), in good yield.

EXAMPLE 5

The procedure of Example 1 was repeated using, 1,8-diaminoanthraquinone in place of 1,5-diaminoanthraquinone and aniline in place of the p-anisidine, both being used in essentially equivalent amounts as indicated in Example 1. The resultant product, 9,10-dihydro-9,10-dioxoanthracene - 1,8 - diyl - bis - (4' - carbamoyl - N-phenylphthalimide) was obtained in good yield. This product was purified by dissolving in hot aqueous sodium hydrosulfite. The solution was filtered and the clarified filtrate was oxidized by the addition of aqueous sodium dichromate. The precipitated product was filtered and washed well with hot water. The product was shown to have excellent mass color when evaluated according to ASTM D-387-60 Procedure B.

It can thus be seen that a novel class of bis-imide compounds has been provided which are useful as colorants for organic polymeric products.

The present invention has been described and illustrated by means of several examples which, although they disclose the best manner known to us of carrying out the process of our invention, are to be considered as descriptive rather than limitative.

We claim:
1. A compound having the following formula:

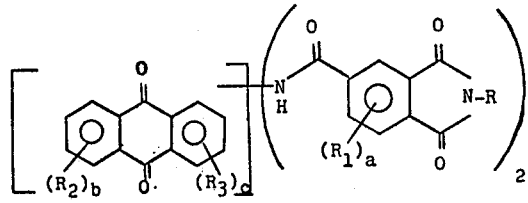

wherein
R is a phenoxy- or an alkoxy-substituted phenyl wherein said alkoxy substituent contains from 1 to 5 carbon atoms; $R_1$, $R_2$, and $R_3$ independently represent members selected from the group consisting of hydrogen, halogen, nitro, trifluoromethyl, alkyl, alkoxy, dialkylamino, and dialkylsulfamyl radicals, wherein the alkyl moieties on said radicals contain from 1 to 6 carbon atoms; and $a$, $b$, and $c$ independently represent members selected from the group of integers consisting of 1, 2, and 3.

2. A compound according to claim 1 having the following formula:

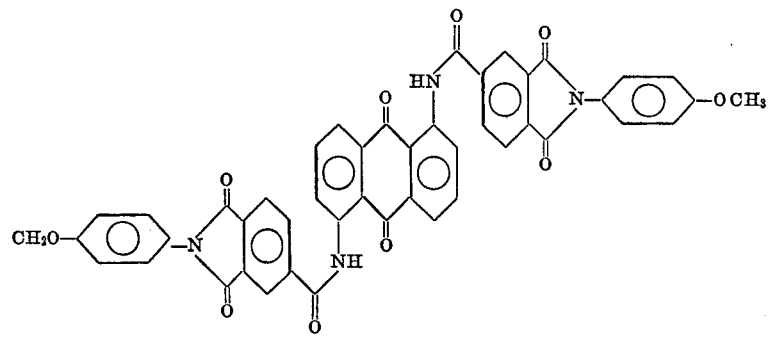

3. A compound according to claim 1 having the following formula:

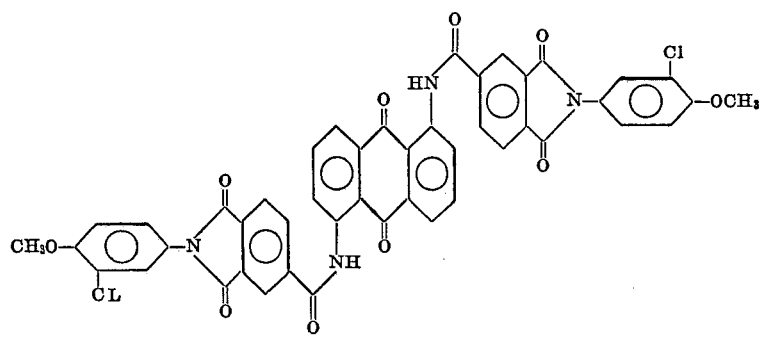

4. A compound according to claim 1 having the following formula:

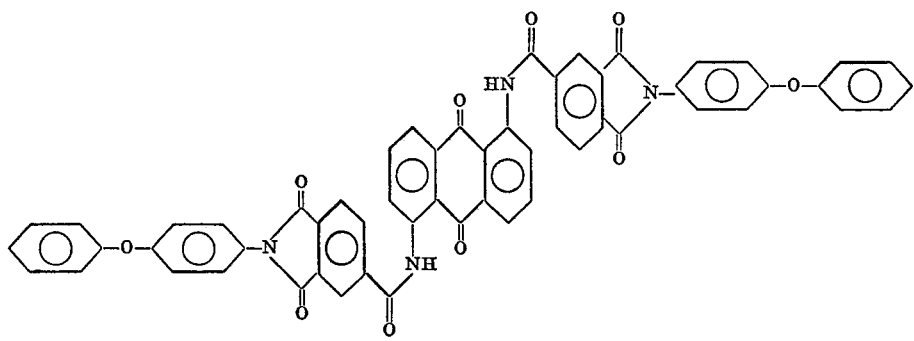

5. A compound according to claim 1 having the following formula:
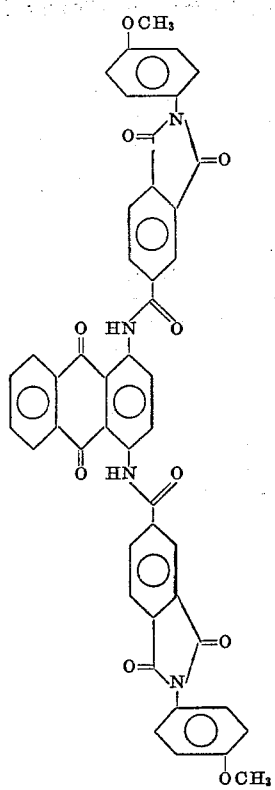
References Cited
UNITED STATES PATENTS
| | | | |
|---|---|---|---|
| 3,126,395 | 3/1964 | Kitahonoki et al. | 260—326 |
| 3,312,715 | 4/1967 | Anderson et al. | 260—326 |
| 3,356,672 | 12/1967 | Schefczik | 260—152 |
ALEX MAZEL, Primary Examiner
J. A. NARCAVAGE, Assistant Examiner
U.S. Cl. X.R.
8—39; 260—37, 247.2, 287, 295, 295.5, 303, 305, 316, 346.3